(12) United States Patent
Kramer

(10) Patent No.: US 6,381,128 B1
(45) Date of Patent: Apr. 30, 2002

(54) ERGONOMIC PORTABLE COMPUTER

(76) Inventor: Russel G. Kramer, 33 Ranch Rd., Falmouth, MA (US) 02536

( * ) Notice: Subject to any disclaimer, the term of this patent is extended or adjusted under 35 U.S.C. 154(b) by 0 days.

(21) Appl. No.: 09/617,631

(22) Filed: Jul. 17, 2000

(51) Int. Cl.[7] .............................................. G06F 1/16
(52) U.S. Cl. ...................... 361/683; 361/679; 361/682; 361/683; 361/684; 361/685; 361/686; 361/724; 361/725; 361/726; 361/727; 361/728; 361/729; 361/730; 361/731; 361/732; 361/733; 361/735; 361/736; 361/737; 361/740; 361/741; 361/742; 361/747; 361/748; 361/752; 361/753; 361/756; 361/759; 312/223.1; 312/223.2; 312/223.3; 364/708; 364/708.1
(58) Field of Search ...................... 361/679, 682–686, 361/724–733, 735, 736, 737, 740, 741, 742, 747, 748, 752, 753, 756, 759; 312/223.1, 223.2; 364/708.1, 708

(56) References Cited

U.S. PATENT DOCUMENTS

| | | |
|---|---|---|
| 4,509,873 A | 4/1985 | Ryan |
| 4,739,451 A | 4/1988 | Kuba |
| 4,931,978 A * | 6/1990 | Drake et al. ................ 364/708 |
| 5,016,849 A | 5/1991 | Wu |
| 5,067,834 A | 11/1991 | Szmanda et al. |
| 5,107,402 A | 4/1992 | Malgouires |
| 5,196,993 A | 3/1993 | Herron et al. |
| 5,206,790 A | 4/1993 | Thomas et al. |
| 5,229,920 A | 7/1993 | Spaniol et al. |
| 5,255,214 A | 10/1993 | Ma |
| 5,319,582 A | 6/1994 | Ma |
| 5,335,142 A | 8/1994 | Anderson |
| 5,345,362 A | 9/1994 | Winkler |
| 5,347,630 A | 9/1994 | Ishizawa et al. |
| D358,374 S | 5/1995 | Yamazaki |
| 5,596,481 A | 1/1997 | Liu et al. |
| 5,644,338 A | 7/1997 | Bowens |
| 5,697,594 A | 12/1997 | Adams et al. |
| 5,729,429 A | 3/1998 | Margaritis et al. |
| 5,745,340 A | 4/1998 | Landau |
| 5,764,474 A | 6/1998 | Youens |
| 5,774,329 A | 6/1998 | Kuo |
| 5,796,576 A | 8/1998 | Kim |
| 5,805,415 A | 9/1998 | Tran et al. |
| 5,812,371 A | 9/1998 | Chen et al. |
| 5,825,612 A | 10/1998 | Aubuchon et al. |
| 6,128,186 A * | 10/2000 | Feierbach ................... 361/683 |

* cited by examiner

*Primary Examiner*—Leo P. Picard
*Assistant Examiner*—Yean-Hsi Chang
(74) *Attorney, Agent, or Firm*—John P. McGonagle

(57) ABSTRACT

A portable computer having a main computer body and a keyboard unit slidably attached to the main computer body and movable to various positions in front of the main computer body. A display unit is also slidably attached to the main computer body and movable to various positions up and away from the computer main body.

8 Claims, 20 Drawing Sheets

ERGONOMIC PORTABLE COMPUTER

BACKGROUND OF THE INVENTION

This invention relates to portable computers, and in particular, to an ergonomically designed portable computer.

Portable computers, alternatively known as either laptops or notebook computers, were introduced to accommodate the mobile computing needs of people whose work environment is not fixed. Portable computers are light and compact so that they may be easily transported from location to location. Portable computers are continuously being down sized into even smaller and lighter portable computers. Portable computers are characterized by unique design demands. In addition to being durable, portable computers must be of compact construction so that they will be sufficiently small and light weight to be readily carried, held and manipulated for portable use.

According to modern ergonomic theory and experience improper posture of human bodies during the use of computers can produce many types of injuries. These are generally classified as repetitive strain injuries. It is ergonomically desirable to have the keyboard unit approximately at elbow level with the user's arms parallel to the body. The top of the display unit should be approximately at eye level.

Prior art portable computers are not ergonomic. Because of their portability, such computers are frequently used in places that require the user to operate such computers from their lap. In such instances, the user must type with his or her wrists bent at an unnatural angle. Necks and heads must be bent downward to view the screens. This is a particular problem with liquid-crystal displays (LCDs) which are typically more difficult to view at oblique angles. By their very nature portable computers are designed to be used in environments which are not conducive to the best ergonomic setup. As shown in FIG. 1, a standard portable computer has a main computer body 1, a keyboard unit 2 which is electrically and mechanically connected to said main computer body 1, and a display unit 3 which is electrically attached to the main computer body 1 and mechanically attached by some type of hinge mechanism 4. The display unit 3 can be rotated about said hinge mechanism 4. When the portable computer is transported or stored, the display unit 3 is folded over the main computer body 1 as a protective cover in a closed position. When in use, the display unit 3 is unfolded and rotated about the hinge mechanism 4 to an open position. As a practical matter, this construction has limited the angle to which the display can be raised in use of the computer. As a result, the display unit 3 of a standard portable computer cannot be positioned at an optimum angle for use of the computer while actually resting on the lap of a user.

SUMMARY OF THE INVENTION

The present invention addresses the problem of prior art portable computers by providing a portable computer with a keyboard unit which is slidably attached to a main computer body and movable to various positions in front of the main computer body. The display unit is also slidably attached to the main computer body and movable to various positions up and away from the computer main body. In this fashion the wrists and head of the user may use the keyboard and display in a more ergonomically comfortable position.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
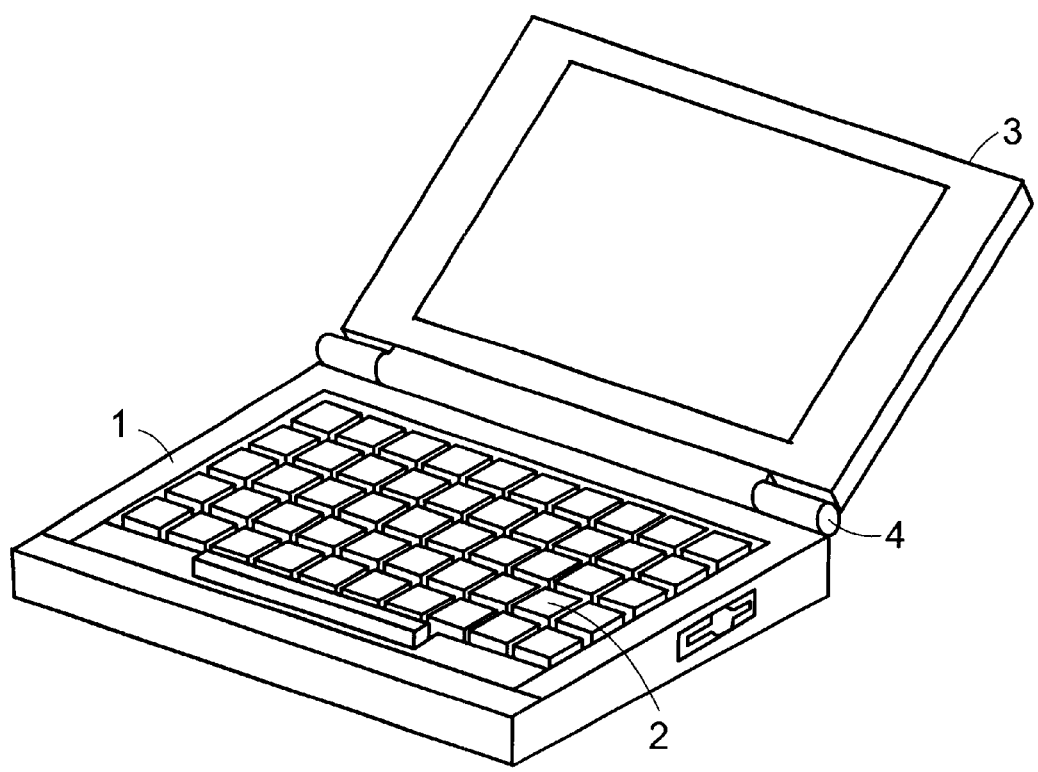
FIG. 1 is a perspective view of a prior art portable computer.
Figure 2A:
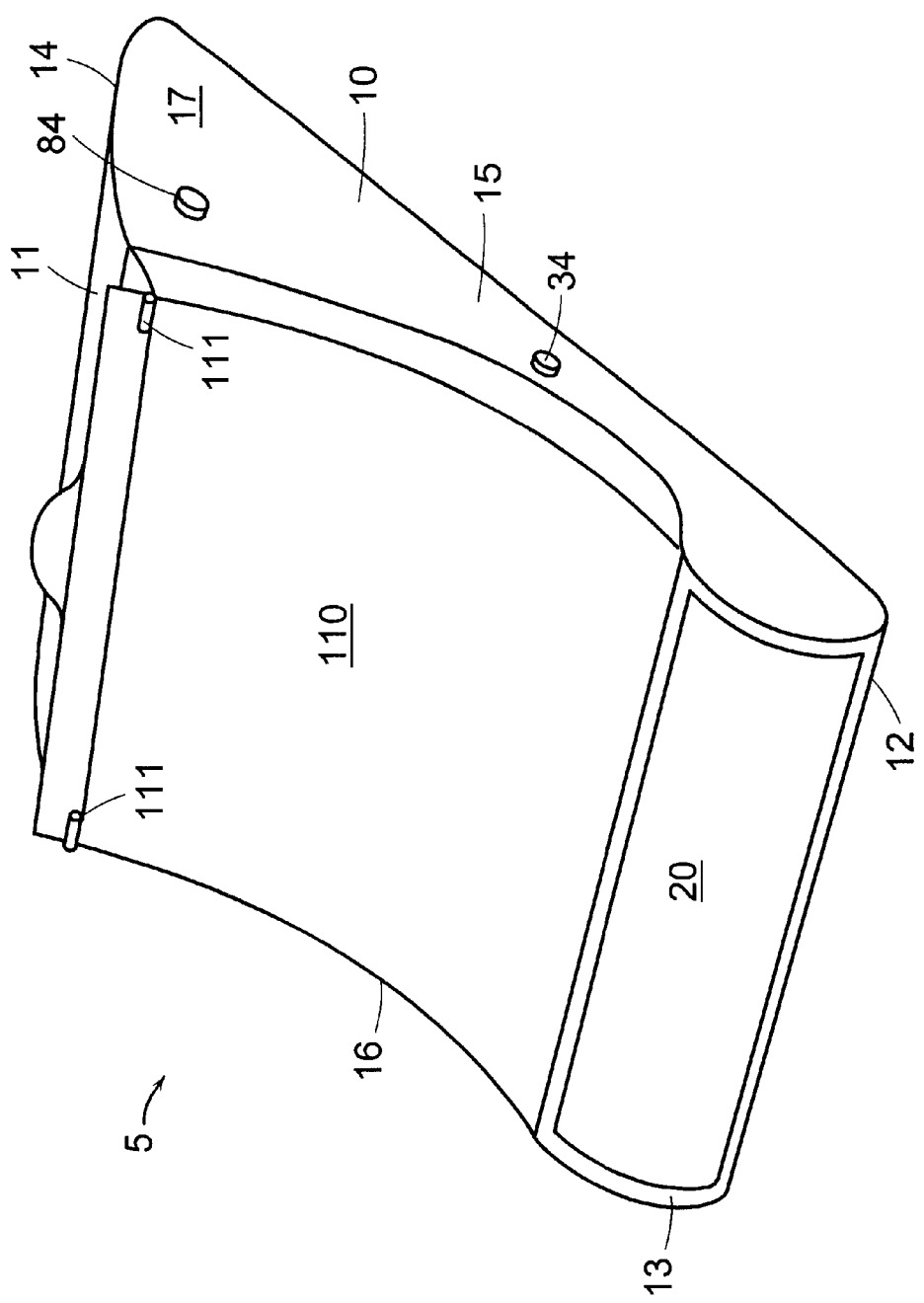
FIG. 2A is a perspective view of one embodiment of the invention, in a closed cover position.
Figure 2B:
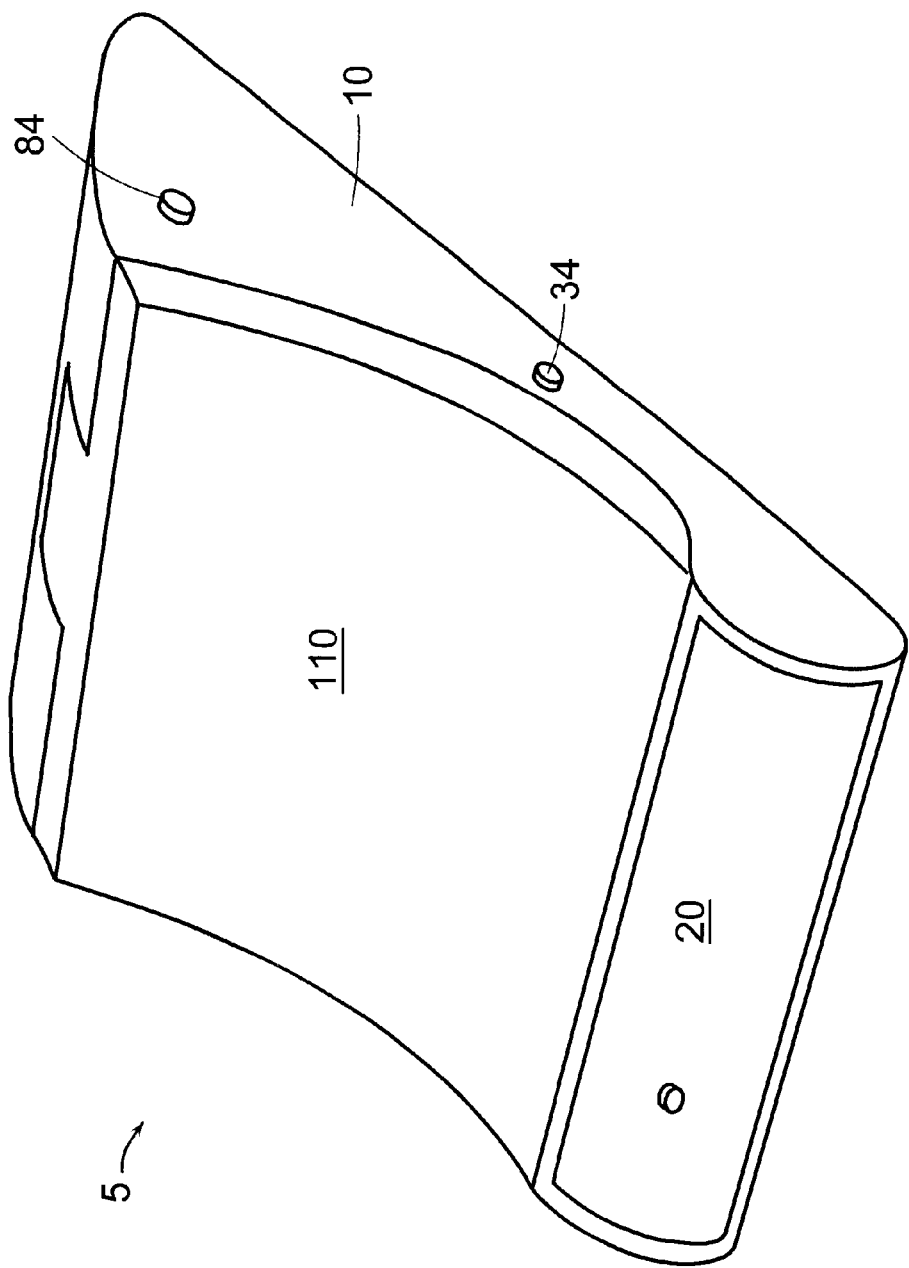
FIG. 2B is a perspective view of another embodiment of the invention, in a closed cover position.

Referring to the drawings in detail wherein like elements are indicated by like numerals, there is shown an embodiment of the invention presented as a portable computer 5. The portable computer 5 has a main computer body 10, a keyboard unit 20 which is electrically and mechanically connected to said body 10, a display unit 60 which is attached to the body 10, and a cover 110. In FIG. 2A the cover 110 is attached to the computer top 11 by means of hinges 111. An alternative embodiment is shown in FIG. 2B wherein the cover 110 is comprised of a clear plexiglass which fits over and is fixedly attached to the computer display unit 60 (see below for display unit details).

The main computer body 10 has a top 11, bottom 12, front 13, rear 14, right side 15, left side 16, an exterior surface 17 and an interior 18. The computer body front 13 and rear 14 define the computer body length. The computer body right side 15 and left side 16 define the computer body width. The keyboard unit 20 is positioned to the computer body front 13 and the display unit 60 is positioned to the top 11 and rear 14. The computer body interior 18 contains the conventional computer electronics (not shown) such as CPU, memory, hard drive, driver electronics, bus, diskette and CD-ROM drives, and the like. The cover 110 may be positioned over the computer body top 11.

Figure 3:
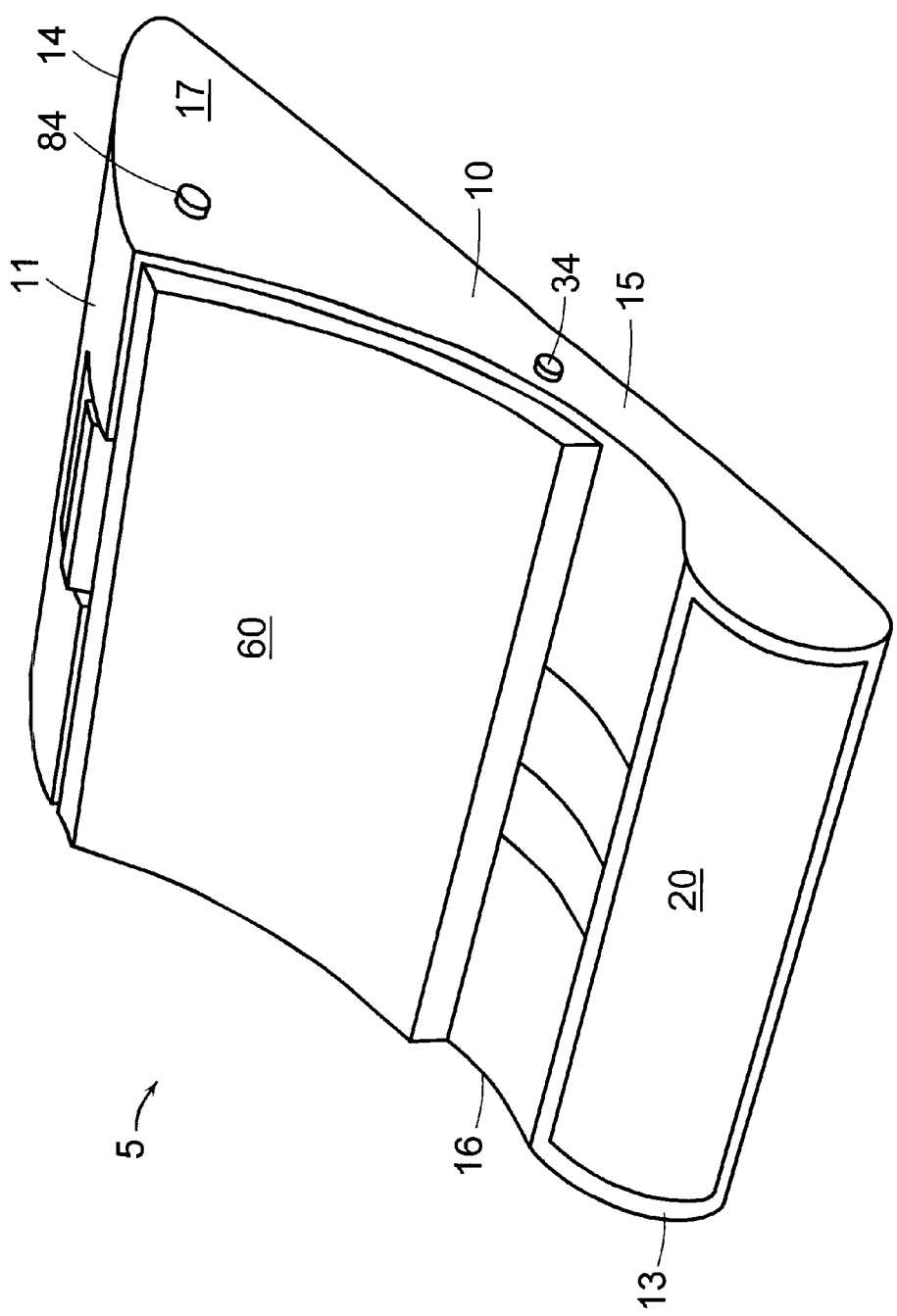
FIG. 3 is a perspective view of the embodiment illustrated in FIG. 2A without a cover.
Figure 4:
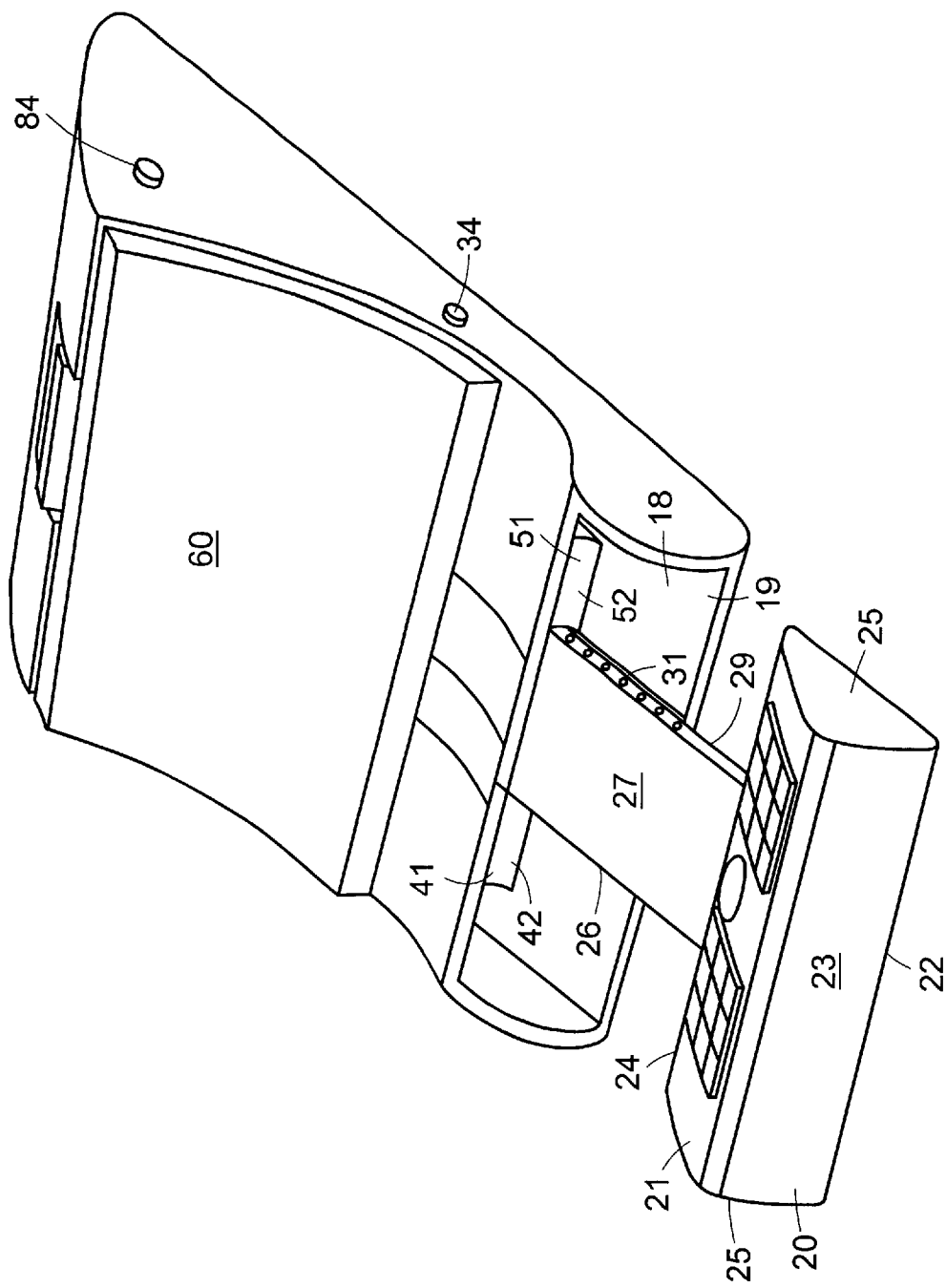
FIG. 4 is a perspective view of the invention with the keyboard deployed.
Figure 5:
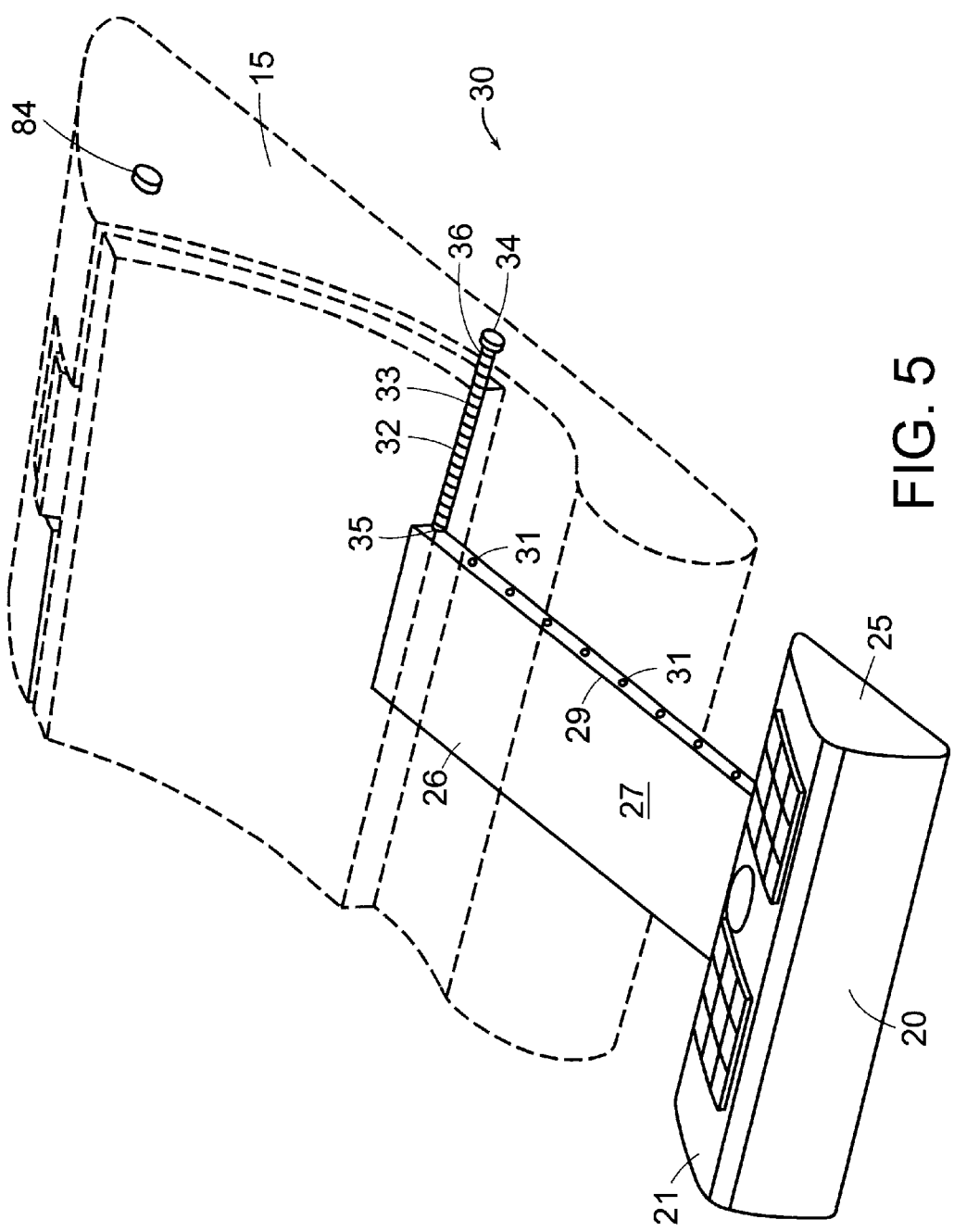
FIG. 5 is a plan view of the keyboard section of FIG. 4.
Figure 6:
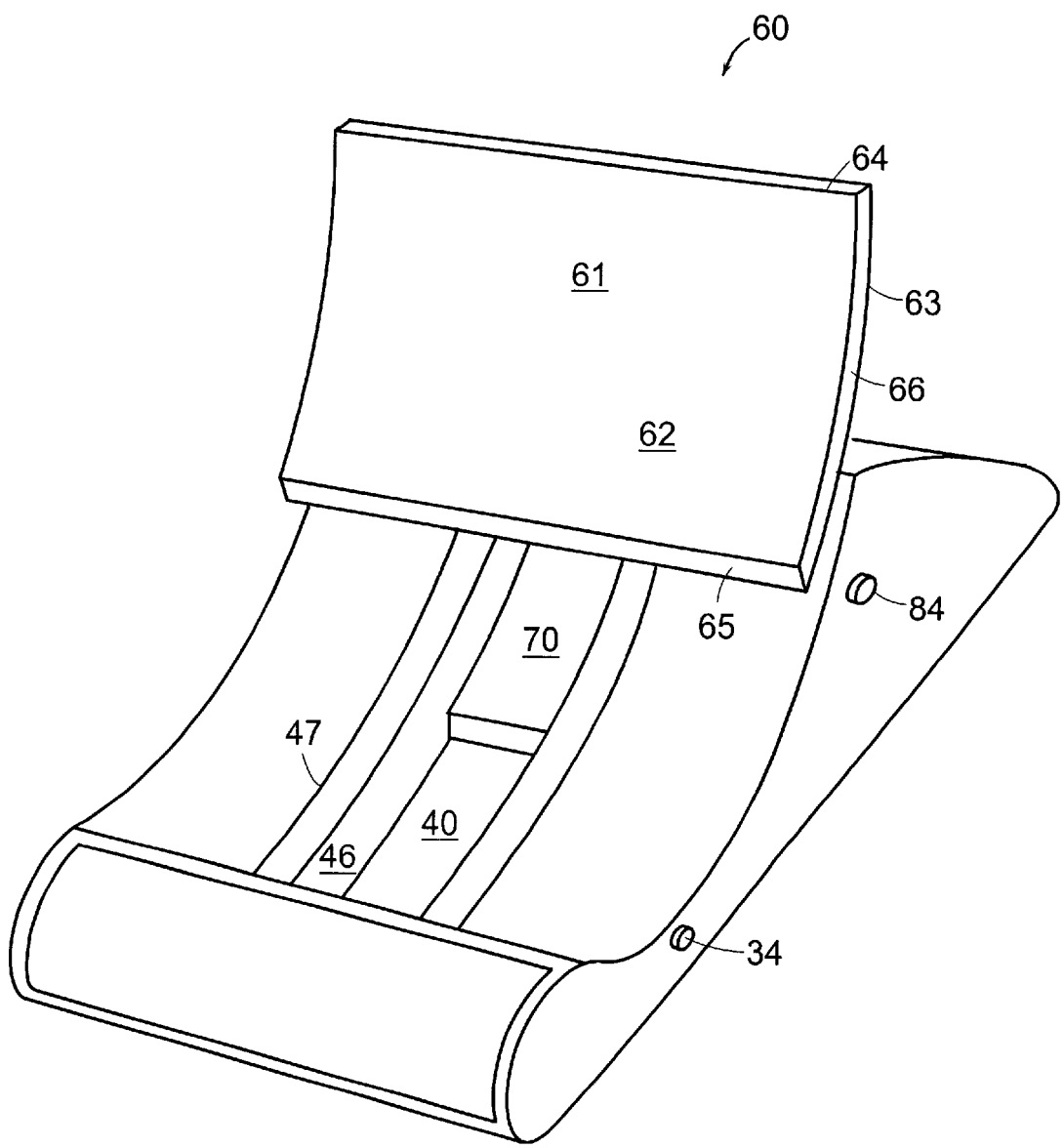
FIG. 6 is a perspective of the invention with the display unit partially deployed.
Figure 7:
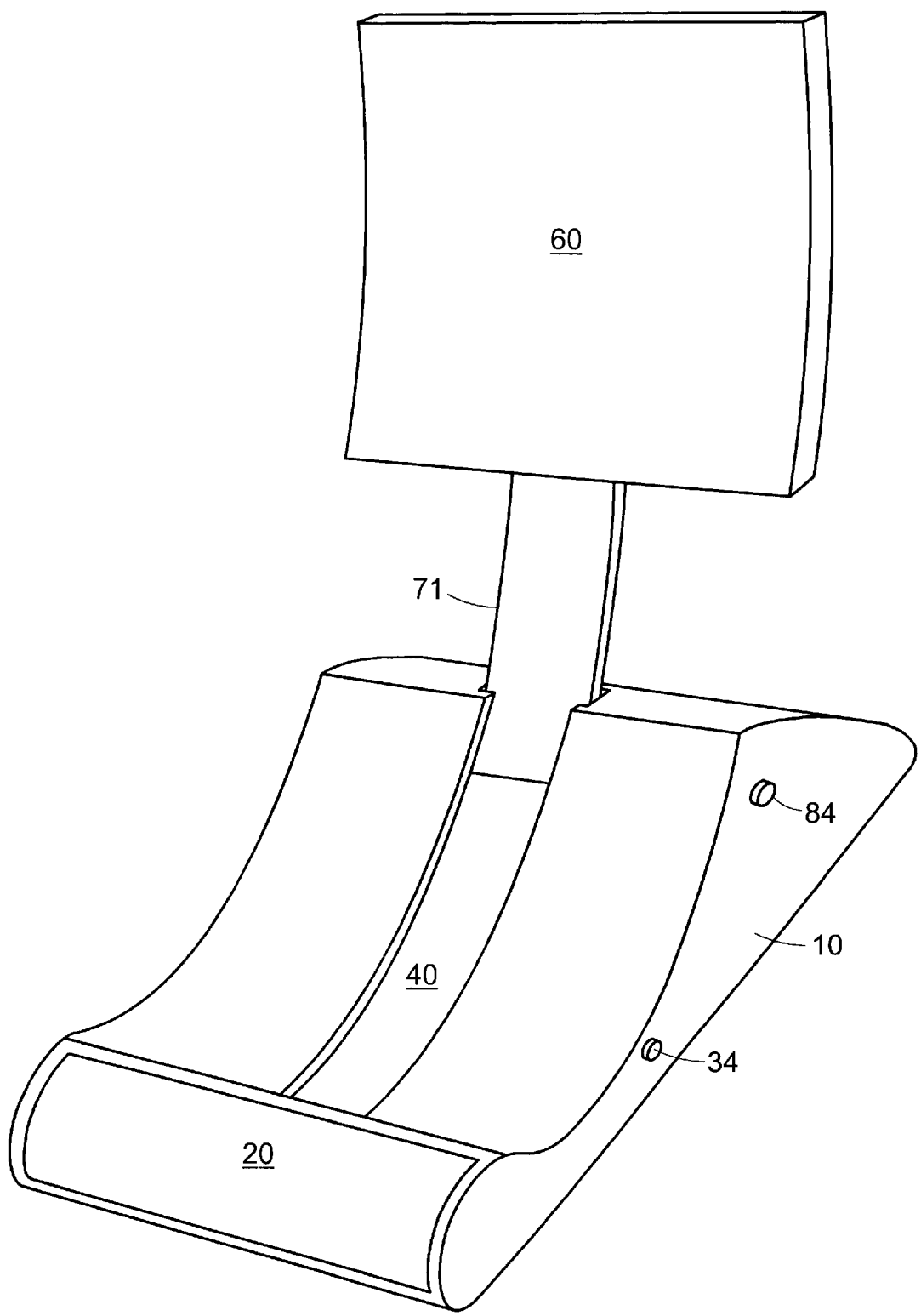
FIG. 7 is a perspective of the invention with the display unit fully deployed.
Figure 8:
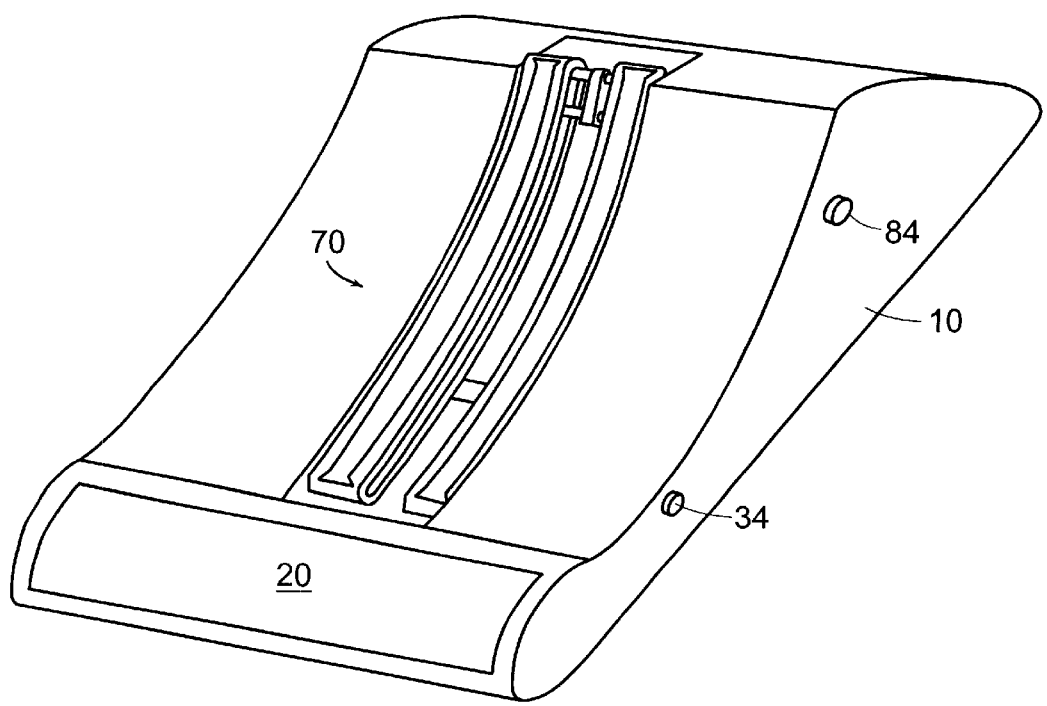
FIG. 8 is a perspective view of the invention display track.
Figure 9A:
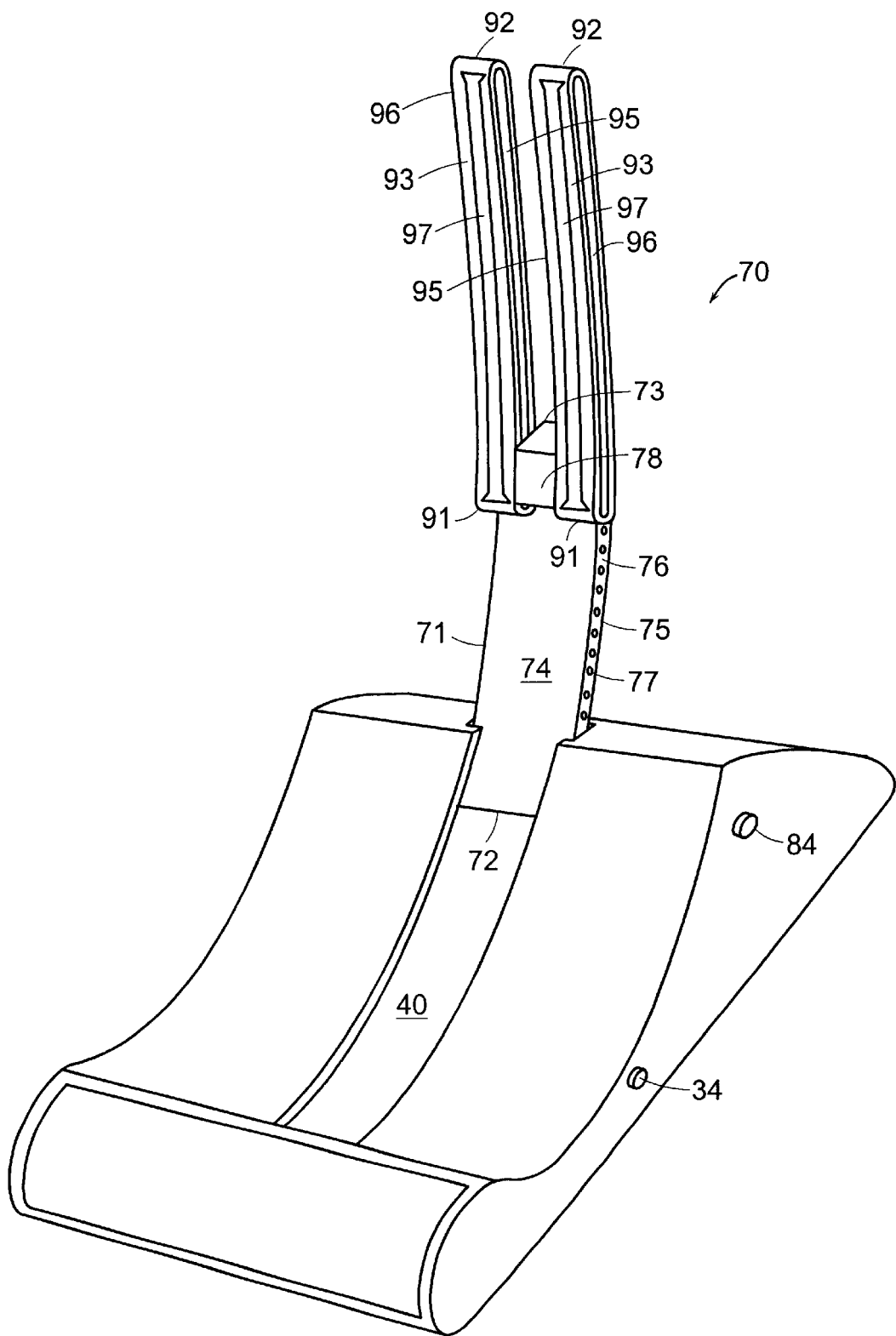
FIG. 9A is a perspective view of the invention display track deployed.
Figure 9B:
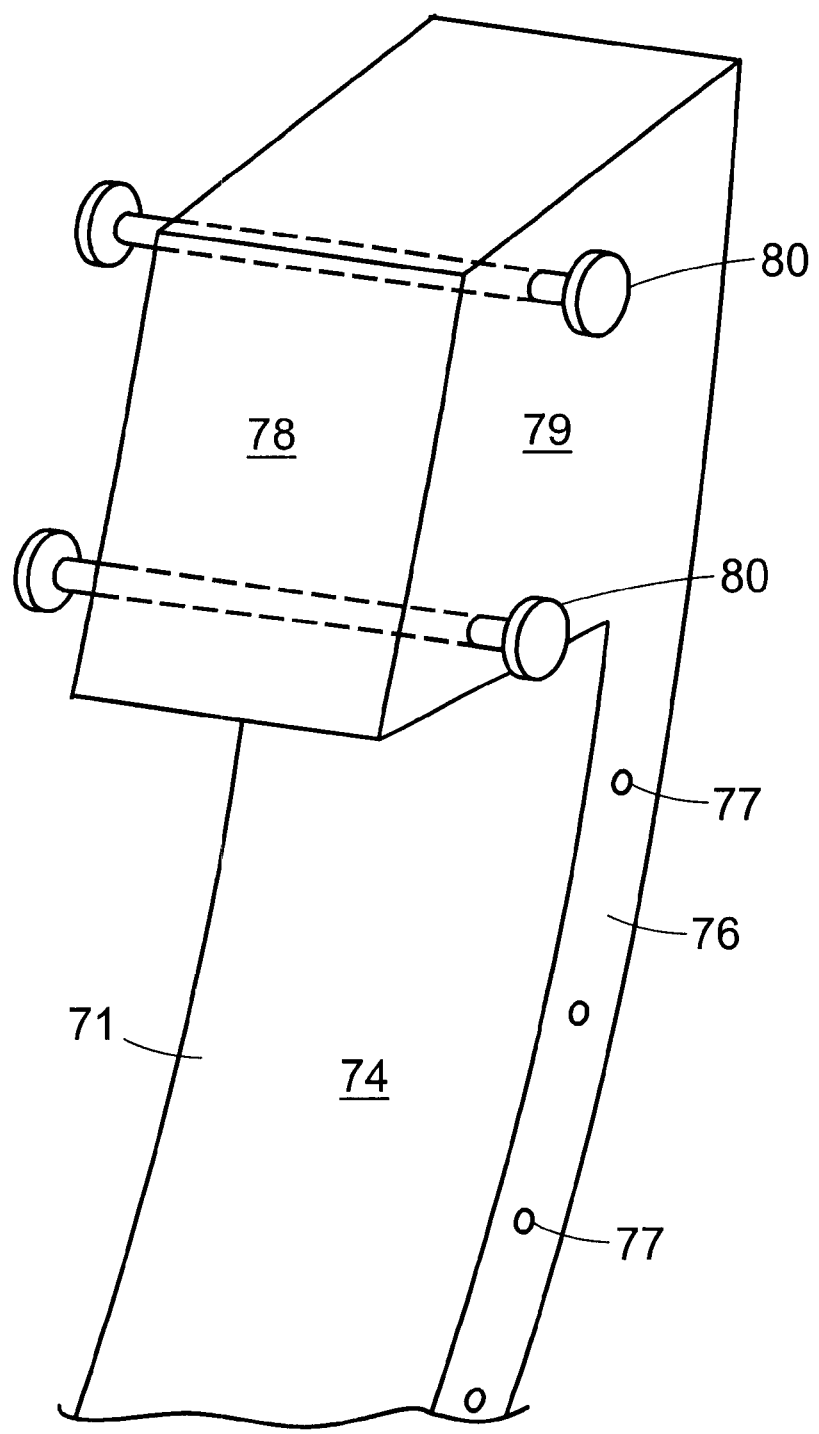
FIG. 9B is a close up view of the block protrusion.
Figure 9C:
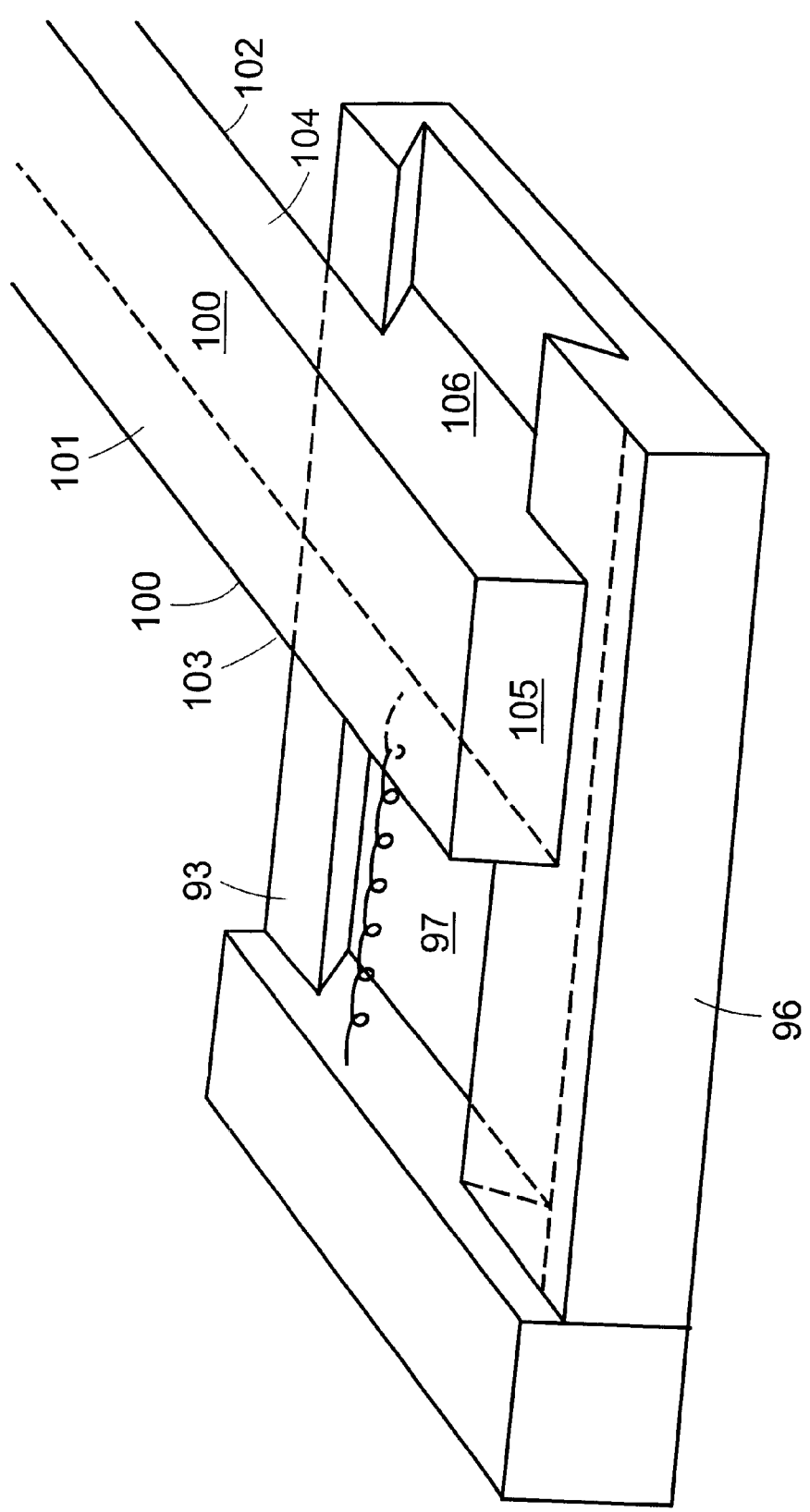
FIG. 9C is a close up view of the block protrusion and clamping elements of FIG. 9A.
Figure 10:
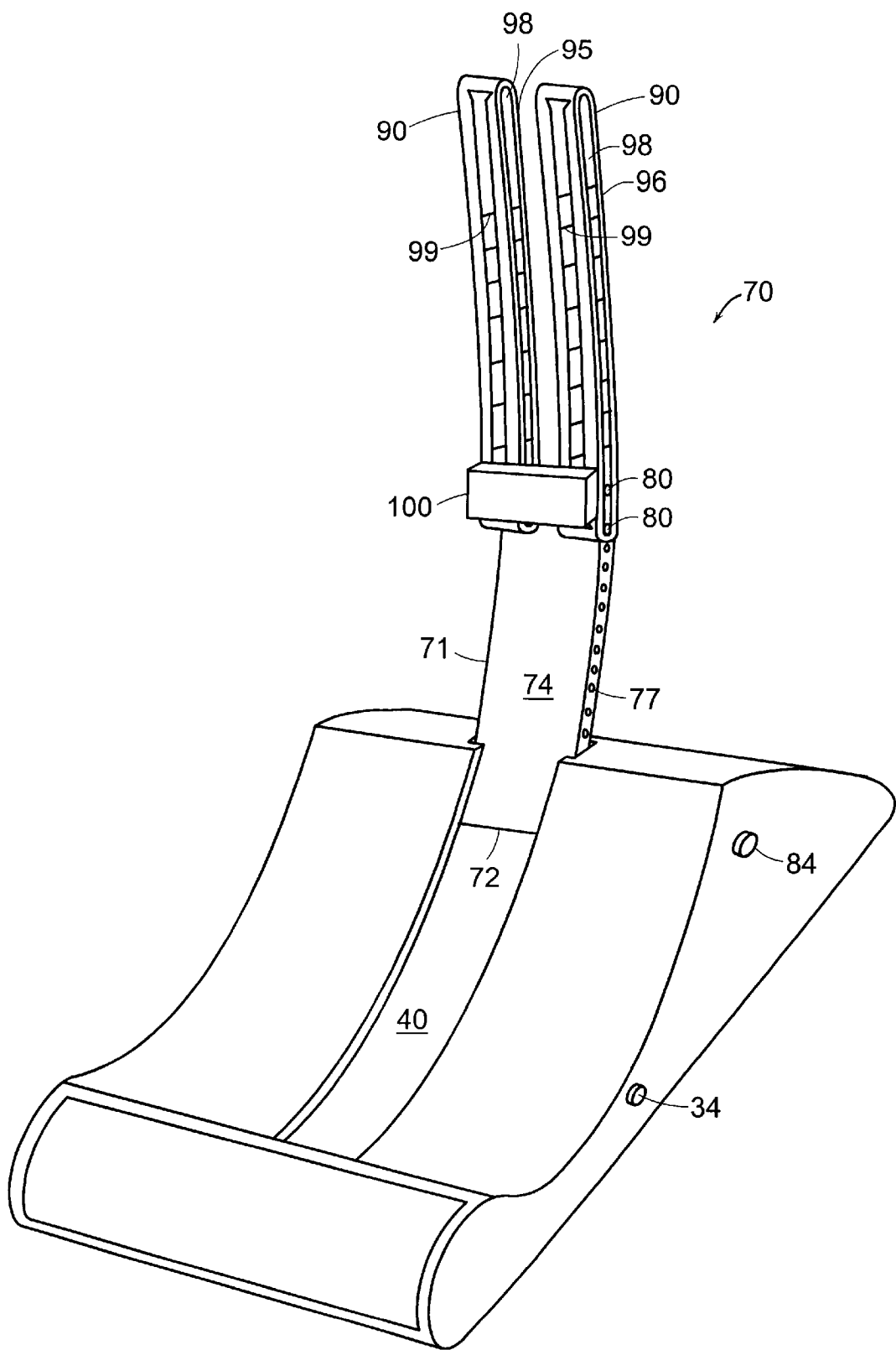
FIG. 10 is a perspective view of another embodiment of the invention display track deployed.
Figure 11:
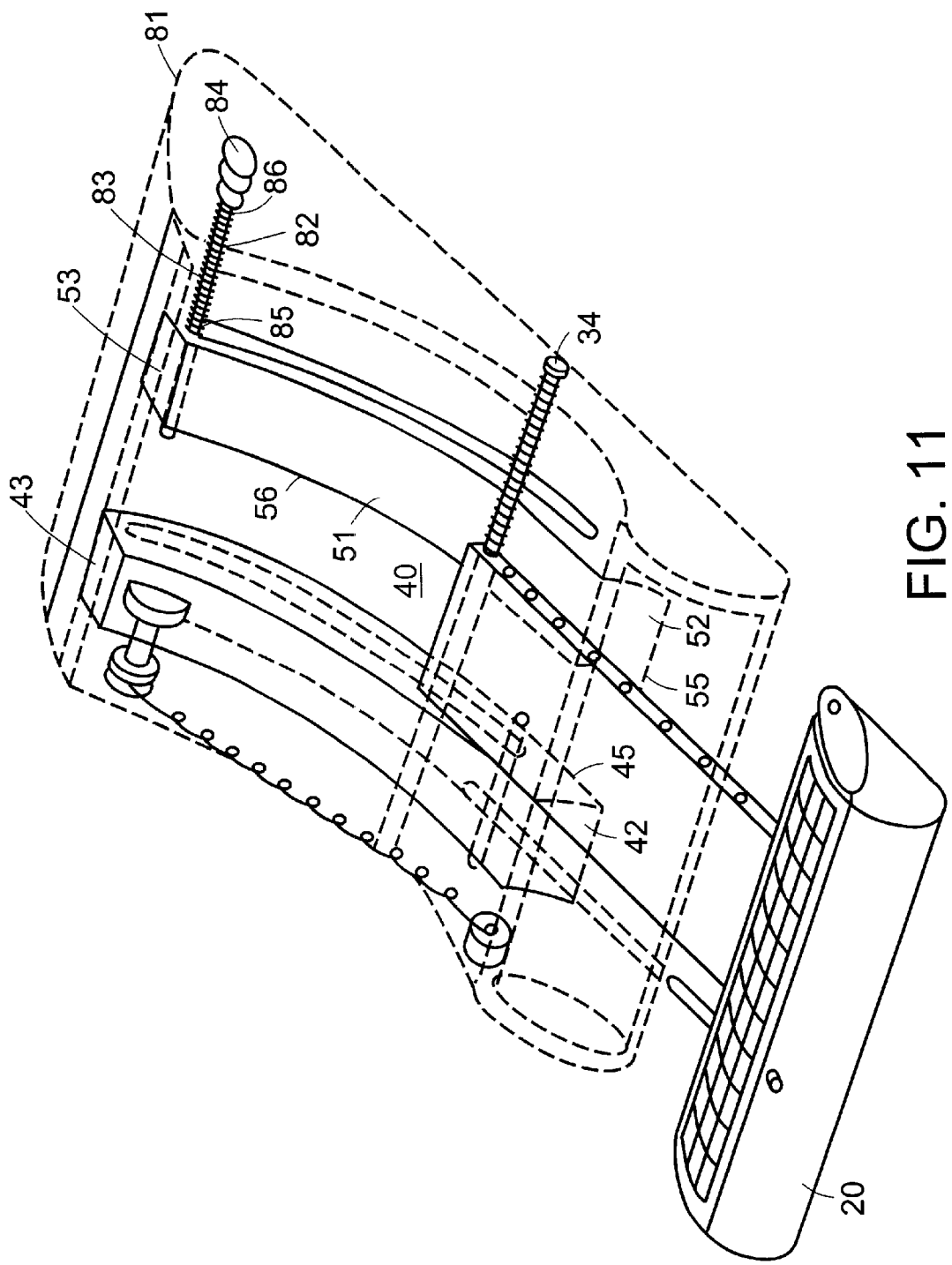
FIG. 11 is a plan view of the display track and keyboard section.
Figure 12A:
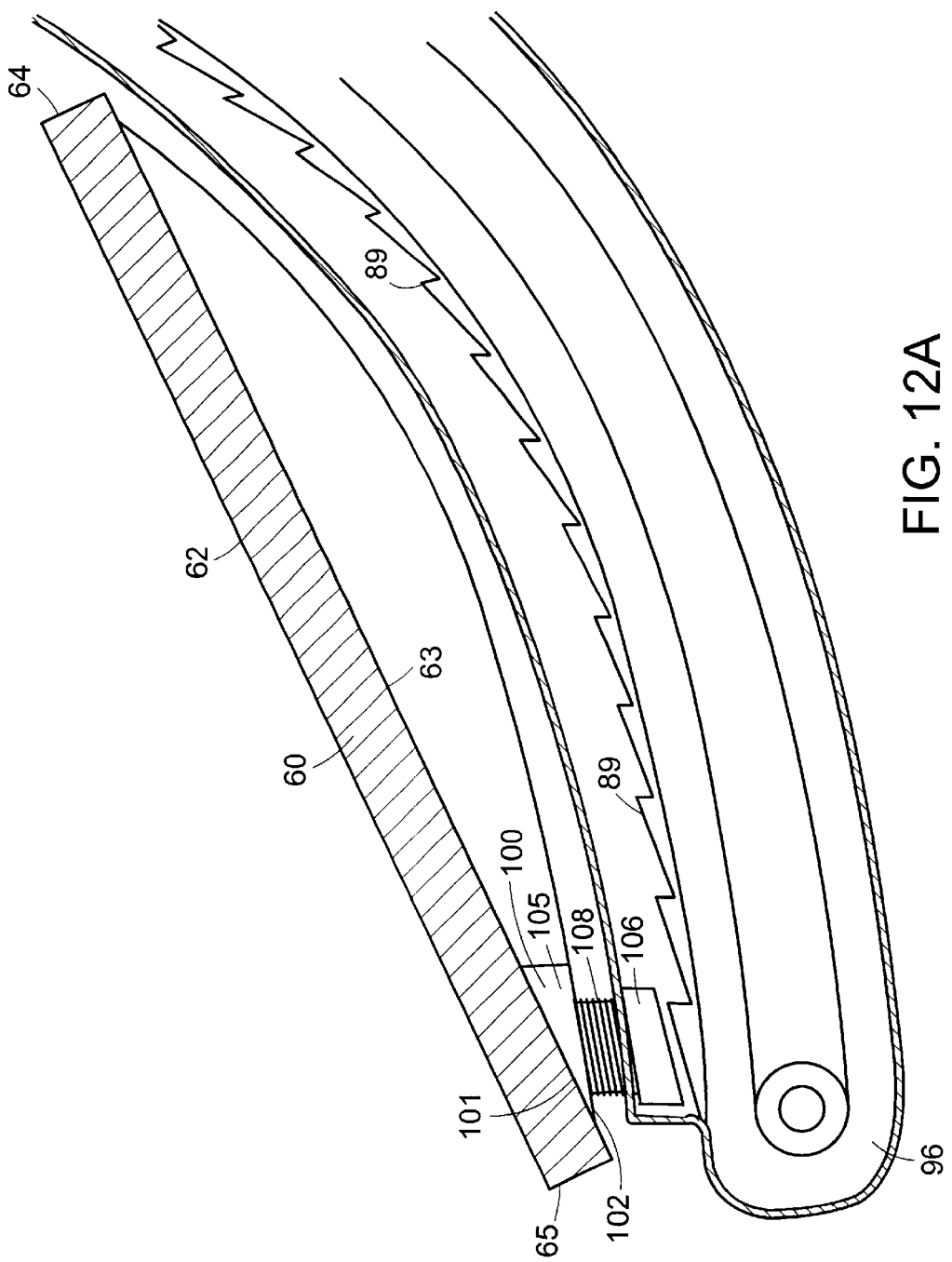
FIG. 12A is a close-up, side view of the monitor and upper display track.
Figure 12B:
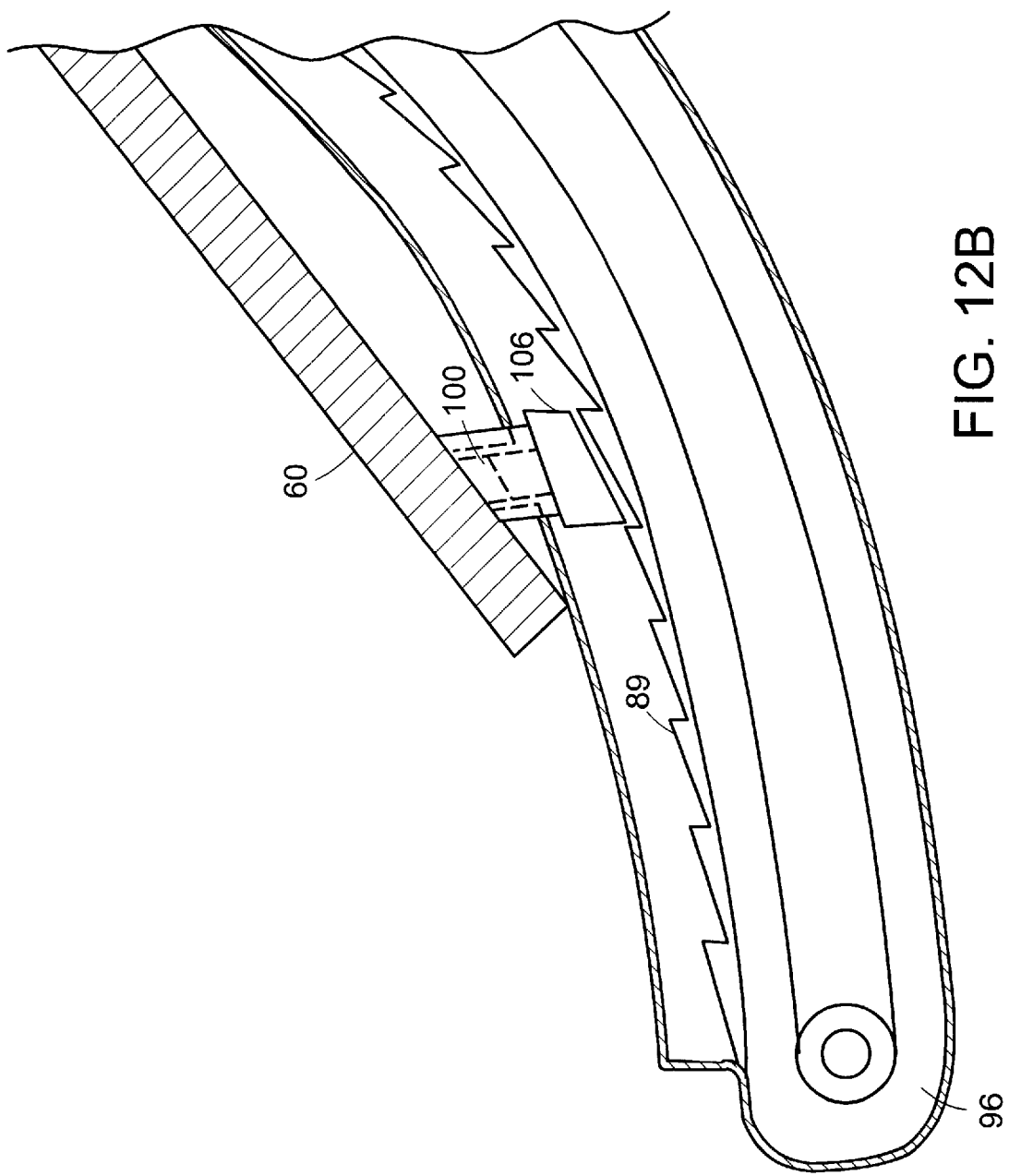
FIG. 12B is a is another embodiment of the apparatus shown in FIG. 12A.
Figure 12C:
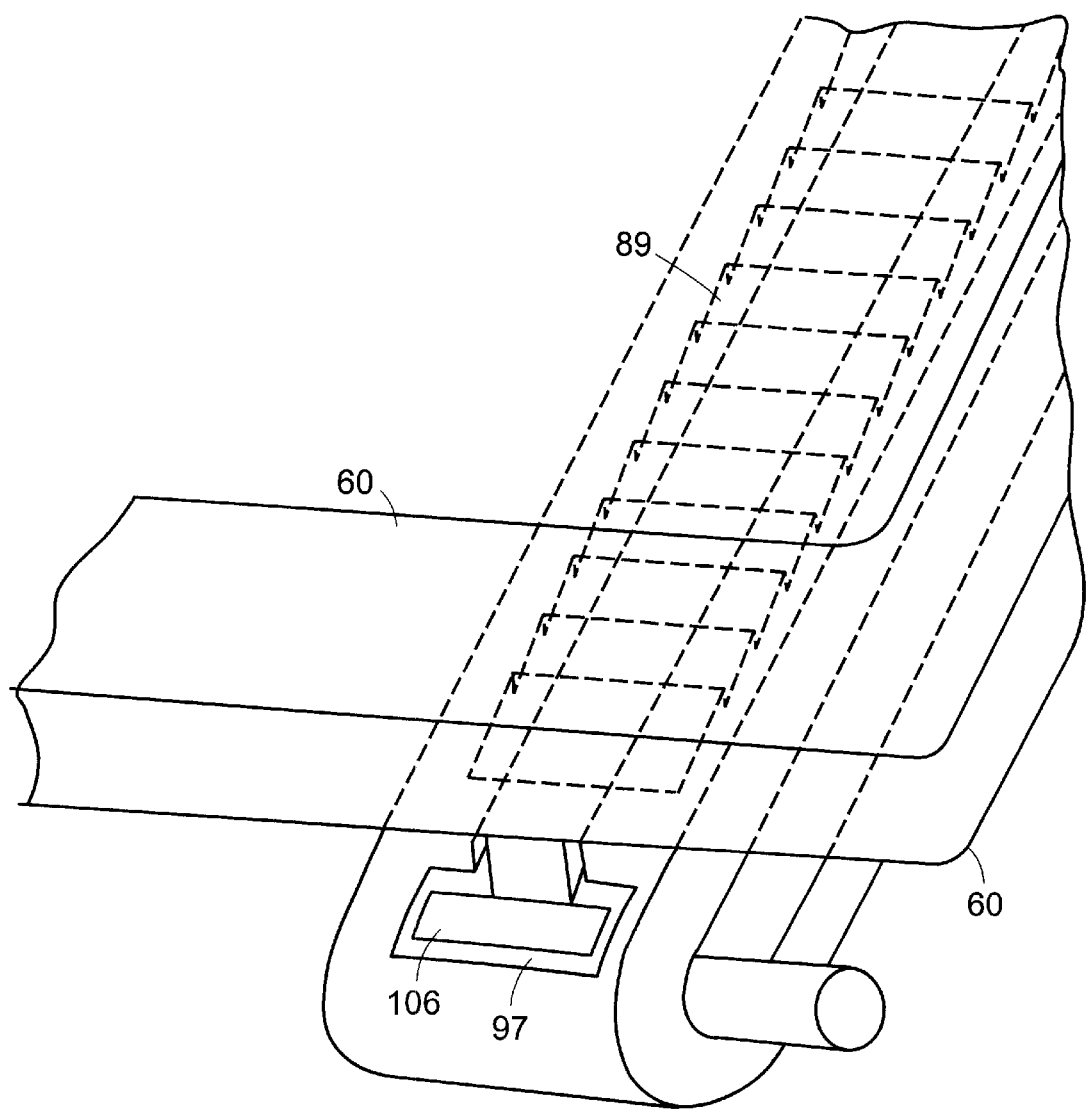
FIG. 12C is a close-up front view of the monitor and upper display track.
Figure 13:
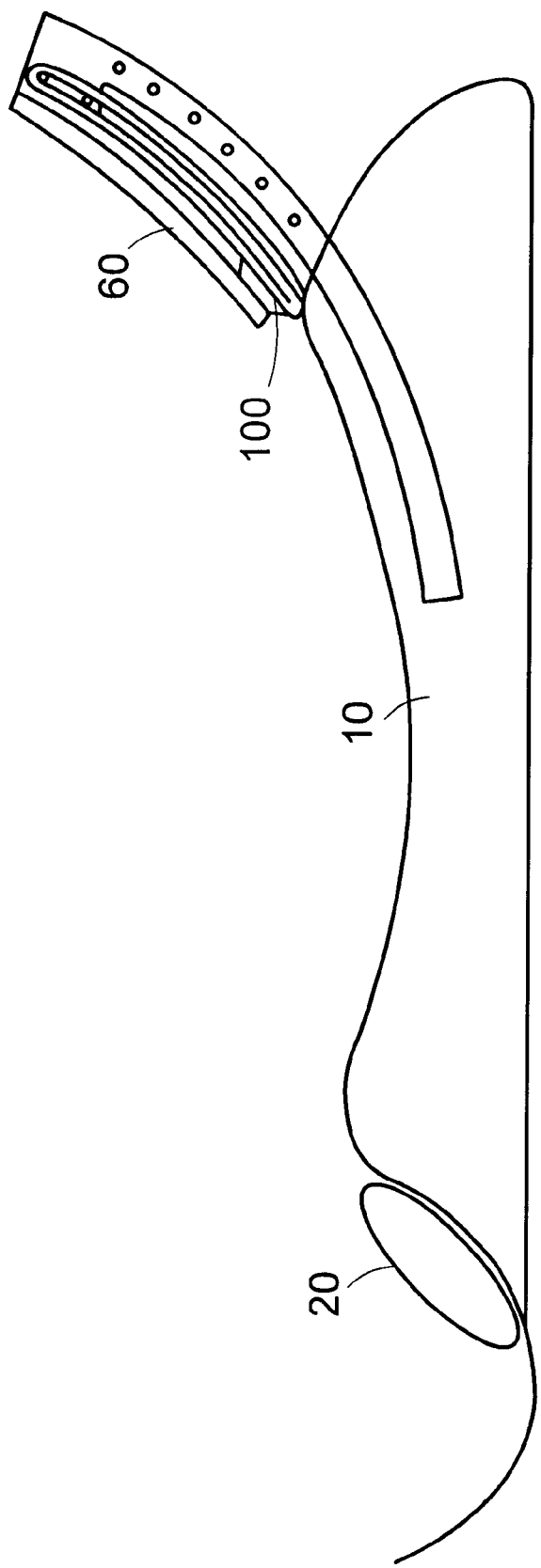
FIG. 13 is a side view of the invention with the display unit partially deployed.
Figure 14:
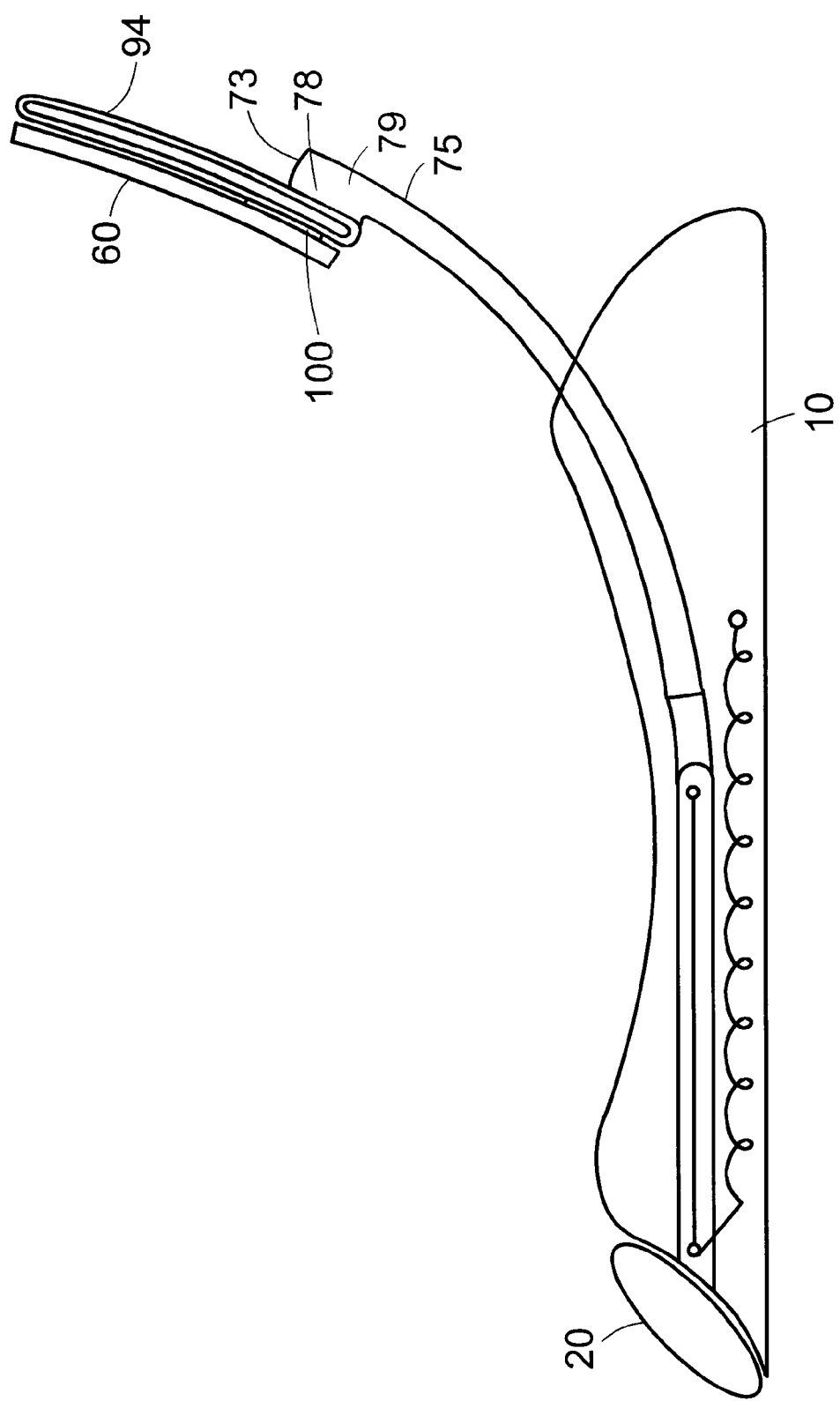
FIG. 14 is a side view of the invention with the display unit intermediately deployed.
Figure 15:
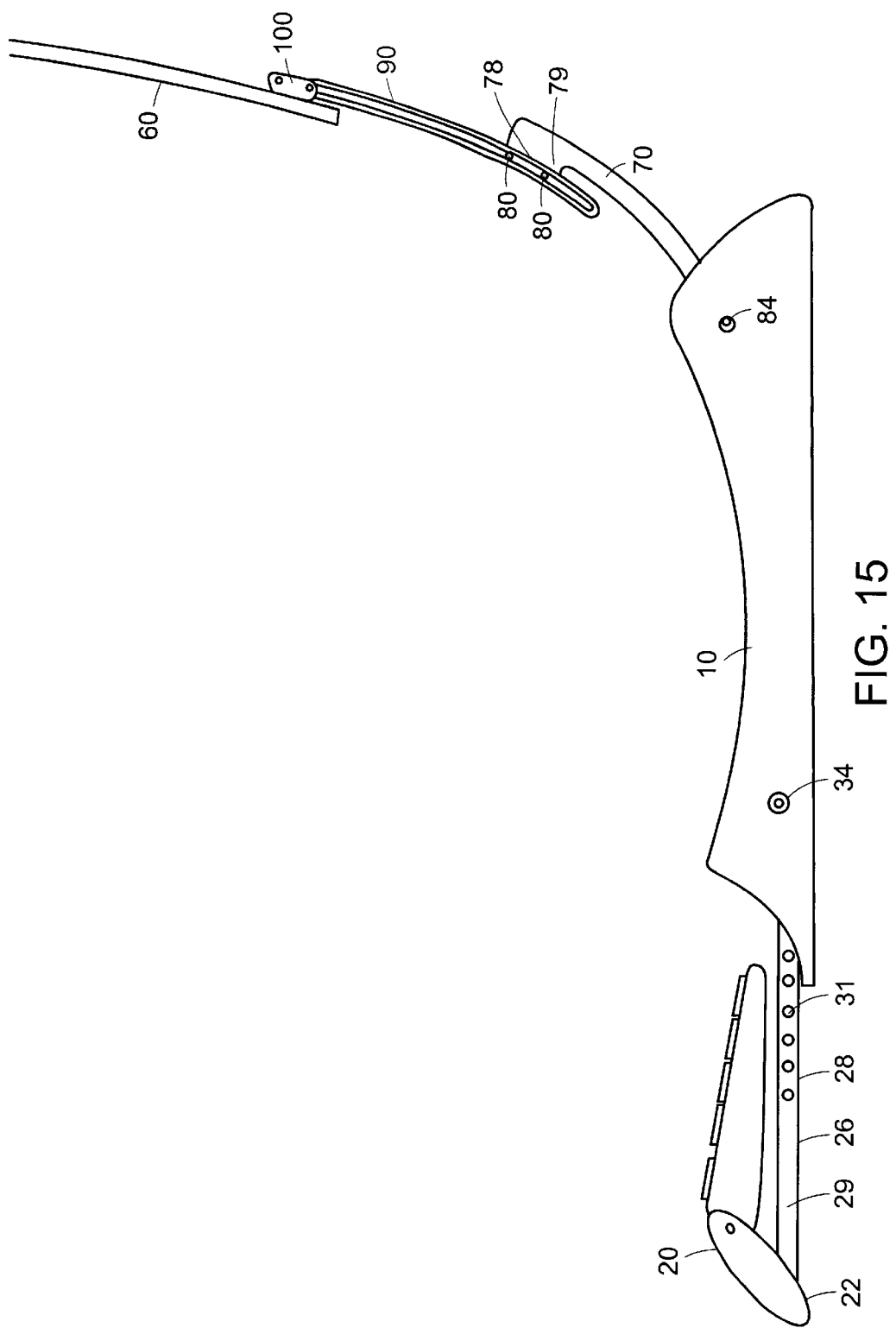
FIG. 15 is a side view of the invention with the display unit fully deployed.

Referring more particularly to FIG. 4, the computer body front 13 has a generally rectangular aperture 19 formed therein, opening into the computer body interior 18. The keyboard unit 20 is inserted into said aperture 19. The keyboard unit 20 has a top 21, bottom 22, front 23, rear 24 and two opposite sides 25 interconnecting said front 23, rear 24, top 21 and bottom 22. When the keyboard unit 20 is inserted into the computer body front aperture 19, the keyboard unit front 23 lies in the same general plane as the computer body front 13 and the keyboard unit rear 24 is positioned within the computer body interior 18. See, FIG. 3. The key board unit rear 24 is attached near its bottom 22 to a generally flat, rectangular, horizontal, interface element 26 protruding into the computer body interior 18. See, also, FIGS. 5 and 15. The keyboard interface element 26 is mechanically and slidably attached to the computer body interior within a computer body interior interface channel 40. See FIGS. 6–11.

The computer body interface channel 40 is comprised of two, spaced, parallel, curved elements 41, 51 extending from near the computer body front 13 and bottom 12 to the computer body rear 14 and top 11. See FIG. 11. Each curved element 41, 51 has a bottom-front 42, 52, top-rear 43, 53, top surface 44, 54, bottom surface 45, 55, inner side 46, 56 and outer side 47, 57. The inner sides 46, 56 are those curved element sides facing each other, the space between the curved element inner sides 46, 56 defining the interface channel 40.

As may be most clearly seen in FIGS. 4, 5, 11 and 15, the keyboard interface element 26 is slidably attached to the computer body interior 18 within the interface channel 40. The interface element 26 is a generally flat, rectangular, horizontal, element lying in a plane generally parallel to the computer body bottom 12. The interface element 26 has a flat upper surface 27, a flat lower surface 28, and two short, interconnecting sides 29. The interface element 26 is adapted to slide into the interface channel 40 between the curved element bottom front 42, 52 and beneath a plane formed by the curved element bottom surfaces 45, 55. A spring locking system 30 comprised of a series of apertures 31 formed in the interface element sides 29, a locking peg 32 slidably mounted on one of the curved element bottom surfaces 55, and a spring 33 having two opposite ends is fitted about the locking peg 32. The spring 33 is attached at one end 35 to an adjacent interface element side 29. The other spring end 36 is attached to the knob 34. The spring 33 will tend to draw the knob 34 toward the interface element thereby forcing the peg 32 toward the interface element side 29. The locking peg 32 is adapted to slide into a desired interface element side aperture 31. Pulling the knob 34 outward from the computer body side 15 will cause the locking peg 32 to slide out of an interface element aperture 31. The keyboard unit 20 may then be pulled out of or reinserted into the computer body 10. Releasing the knob 34 will allow the spring 33 to force the locking peg 32 to reseat into one of the apertures 31.

As stated above the display unit 60 is positioned to the top 11 and rear 14 of the computer body 10. The display 61, itself, is a planar, generally rectangular element comprised (in this embodiment) of a liquid-crystal display (LCD). The display 61 has a front viewing surface 62, a rear 63, a top 64, a bottom 65, and two sides 66. The display 61 is attached to an interface subsystem 70 which is slidably interfaced with the interface channel 40. The interface subsystem 70 is comprised of a curved display interface element 71 slidably positioned within the interface channel 40, and two, parallel, interface clamping elements 90 joining the interface element 71 to the display 61.

The interface element 71 is a flat, elongated, curved element having a bottom-front 72, top-rear 73, top surface 74, bottom surface 75, and two opposing sides 76, said bottom-front 72 and top-rear 73 defining the longitudinal axis of the element 71. The interface element 71 has a curvature approximately equal to the curvature of the two, spaced, parallel, curved elements 41, 51 forming the interface channel 40. The interface element sides 76 abut the curved element inner sides 46, 56 and have a series of apertures 77 formed therein. A block protrusion 78 is formed on the element top surface 74 abutting the element top-rear 73, said block 78 having opposing sides 79 parallel to the element sides 76, said block 78 having a side-to-side width equal to less than half the side-to-side width of the element top surface 74. The two block sides 79 each have two pegs 80 protruding therefrom.

The display interface element 71 is positioned within the computer body interior interface channel 40. The interface element 71 is adapted to slide into the interface channel 40 between the curved element inner sides 46, 56. A spring locking system 81 in combination with the interface element side apertures 77 provides a locking peg 82 slidably mounted through the sides 56, 57 of one of the curved elements 51, and a spring actuating system 83. The spring locking system 81 is comprised of the apertures 77 formed in the interface element sides 76, a locking peg 82 terminating in a knob 84 mounted externally on a side 15 of the computer body 10. A spring 83 having two opposite ends is fitted about the locking peg 82. The spring 83 is attached at one end 85 to an adjacent interface element side 57. The other spring end 86 is attached to the knob 84. The spring 83 will tend to draw the knob 84 toward the interface element thereby forcing the peg 82 toward the interface element side 76. The locking peg 82 is adapted to slide into a desired interface element side aperture 77. Pulling the knob 84 outward from the computer body side 15 will cause the locking peg 82 to slide out of an interface element aperture 77. The interface element 71 may then be slid up from the computer body 10 or down into the computer body 10. Releasing the knob 84 will allow the spring 83 to force the locking peg 82 to reseat into one of the apertures 77.

As stated above two, spaced, parallel, elongated, hollow, interface clamping elements 90 join the display 61 to the interface element 71. Each clamping element 90 has a curved shape with the same approximate curvature as the display interface element 71. Each clamping element 90 has a length approximately equal to the length of the display interface element 71. Each clamping element 90 has a bottom-front 91, top-rear 92, top surface 93, bottom surface 94, open inner side 95 and open outer side 96. The inner sides 95 are those sides facing each other. The clamping element bottom-front 91 and top-rear 92 define the general longitudinal axis of each clamping element 90. The openings 98 in the sides extend from inner side 95 to outer side 96 and are corrugated with transverse slots 99 along the clamping element longitudinal axis. The display interface element block pegs 80 engage the clamping element side openings 98 and rest within a desired transverse slot 99.

The top surface 93 of each clamping element 90 has an elongated, beveled slit channel 97 formed therein. Within the channel 97 a series of transverse wedge-shaped protrusions 89 are formed along the clamping element longitudinal axis.

Fixedly attached to the display rear 63 is a generally rectangular, interface block 100. See FIGS. 9C, 10 and 12A–C. Each interface block 100 has a top surface 101, bottom surface 102, top side 103, bottom side 104, and opposing sides 105 interconnecting said top and bottom surfaces 101, 102, and top and bottom sides 103, 104. The interface block top surface 101 is adapted to be fixedly attached to said display rear 63. The interface block bottom surface has two, parallel, spaced, beveled protrusions 106 adapted to being inserted into said clamping element top surface beveled slits 97. The beveled protrusions have bottom surfaces 107 which are formed into wedges compatible with the clamping element, slit channel, wedge-shaped protrusions 89. In one embodiment of the invention, a compression spring 108 is placed about the upper portion of the beveled protrusion 106 adjacent the interface block bottom surface 102.

It is understood that the above-described embodiment is merely illustrative of the application. Other embodiments may be readily devised by those skilled in the art which will embody the principles of the invention and fall within the spirit and scope thereof.

I claim:

1. An ergonomic portable computer, comprising:
   a main computer body having a top, bottom, front, rear, right side, left side, an exterior surface and an interior, said computer body front and rear defining a computer body length, said computer body right side and left side defining a computer body width, said computer body interior containing conventional computer electronics such as central processor unit, memory, hard drive, driver electronics, bus, diskette and CD-ROM drives, wherein said computer body front has a generally rectangular aperture formed therein, opening into the computer body interior;
   a keyboard unit electrically connected and slidably attached to said main computer body, said keyboard unit movable to various positions in front of the main computer body, said keyboard unit having a top, bottom, front, rear and two opposite sides interconnecting said front, rear, top and bottom, wherein said keyboard unit is inserted into said front aperture, wherein said keyboard unit front lies in the same general plane as the computer body front, wherein said keyboard unit rear is positioned within the computer body interior;
   a display unit electrically connected and slidably attached to said main computer body, said display unit movable to various positions up and away from said main computer body, said display unit being a planar, generally rectangular element comprised of a liquid-crystal display, said display unit having a front viewing surface, a rear, a top, a bottom, and two sides;
   a cover positioned over the computer main body top;
   wherein said keyboard unit is positioned to the computer main body front and said display unit is positioned to the computer main body top and rear;
   a generally flat, rectangular, horizontal, interface element protruding into the computer body interior, and attached to said key board unit rear and bottom, said interface element being mechanically and slidably attached to the computer body interior within a computer body interior interface channel, said computer body interface channel being comprised of two, spaced, parallel, curved elements extending from near the computer body front and bottom to the computer body rear and top, each said curved element having a bottom-front, top-rear, top surface, bottom surface, inner side and outer side, said inner sides being those curved element sides facing each other, the space between the curved element inner sides defining the interface channel.

2. An ergonomic portable computer as recited in claim 1, wherein:
   said keyboard interface element being a generally flat, rectangular, horizontal, element lying in a plane generally parallel to the computer body bottom, said interface element having a flat upper surface, a flat lower surface and two short, interconnecting sides, said interface element being adapted to slide into the interface channel between the curved element bottom fronts and beneath a plane formed by the curved element bottom surfaces.

3. An ergonomic portable computer as recited in claim 2, further comprising:
   a spring locking system comprised of a series of apertures formed in the interface element sides, a locking peg slidably mounted on one of the curved element bottom surfaces and terminating at one end in a knob protruding externally through a computer main body side, and a spring having two opposite ends fitted about the locking peg, said spring being attached at one end to an adjacent interface element side, said other spring end being attached to said knob;
   wherein said spring is adapted to draw said knob toward the interface element thereby forcing the peg toward the interface element side, said locking peg being adapted to slide into a desired interface element side aperture;
   wherein pulling the knob outward from the computer body side will cause the locking peg to slide out of an interface element aperture;
   wherein releasing said knob will allow the spring to force the locking peg to reseat into one of the apertures.

4. An ergonomic portable computer, comprising:
   a main computer body having a top, bottom, front, rear, right side, left side, an exterior surface and an interior, said computer body front and rear defining a computer body length, said computer body right side and left side defining a computer body width, said computer body interior containing conventional computer electronics such as central processor unit, memory, hard drive, driver electronics, bus, diskette and CD-ROM drives;
   a keyboard unit electrically connected and slidably attached to said main computer body, said keyboard unit movable to various positions in front of the main computer body, said keyboard unit having a top, bottom, front, rear and two opposite sides interconnecting said front, rear, top and bottom;
   a display unit electrically connected and slidably attached to said main computer body, said display unit movable to various positions up and away from said main computer body, said display unit being a planar, generally rectangular element comprised of a liquid-crystal display, said display unit having a front viewing surface, a rear, a top, a bottom, and two sides;

a cover positioned over the computer main body top;

wherein said keyboard unit is positioned to the computer main body front and said display unit is positioned to the computer main body top and rear;

a display interface subsystem slidably interfaced with a computer body interior interface channel, said computer body interface channel being comprised of two, spaced, parallel, curved elements extending from near the computer body front and bottom to the computer body rear and top, each said curved element having a bottom-front, top-rear, top surface, bottom surface, inner side and outer side, said inner sides being those curved element sides facing each other, the space between the curved element inner sides defining the interface channel, said interface subsystem comprising:

a curved display interface element slidably positioned within said interface channel, said interface element being a flat, elongated, curved element having a bottom-front, top-rear, top surface, bottom surface, and two opposing sides, said bottom-front and top-rear defining a longitudinal axis of the element, said interface element having a curvature approximately equal to the curvature of the two, spaced, parallel, curved elements forming the interface channel, said interface element sides abutting the curved element inner sides, said interface element sides having a series of apertures formed therein, said display interface element being positioned within the computer body interior interface channel and adapted to slide into the interface channel between the curved element inner sides;

two, spaced, parallel, elongated, hollow, interface clamping elements joining the interface element to the display;

a block protrusion formed on the element top surface abutting the element top-rear, said block having opposing sides parallel to the element sides, said block having a side-to-side width equal to less than half the side-to-side width of the element top surface, said block sides each have two pegs protruding therefrom;

a spring locking system in combination with said interface element side apertures comprised of a locking peg slidably mounted through the sides of one of the curved elements and terminating in a knob mounted externally on a side of the computer body, and a spring having two opposite ends, said spring being fitted about the locking peg, said spring being attached at one end to an adjacent interface element side and said other spring end being attached to the knob, said spring tending to draw the knob toward the interface element thereby forcing the peg toward the interface element side, said locking peg being adapted to slide into a desired interface element side aperture;

wherein pulling the knob outward from the computer body side will cause the locking peg to slide out of an interface element aperture; and wherein releasing the knob will allow the spring to force the locking peg to reseat into one of the apertures.

5. An ergonomic portable computer as recited in claim 4, wherein:

each said clamping element has a curved shape with the same approximate curvature as the display interface element, each said clamping element having a length approximately equal to the length of the display interface element each clamping element having a bottom-front, top-rear, top surface, bottom surface, open inner side and open outer side, said inner sides being those sides facing each other, each said clamping element bottom-front and top-rear define the general longitudinal axis of each clamping element, said openings in the sides extending from inner side to outer side and being corrugated with transverse slots along the clamping element longitudinal axis;

wherein said display interface element block pegs engage the clamping element side openings and rest within a desired transverse slot.

6. An ergonomic portable computer as recited in claim 5, further comprising:

an elongated, beveled slit channel formed in the top surface of each clamping element;

a series of transverse wedge-shaped protrusions formed along the clamping element longitudinal axis within each said channel.

7. An ergonomic portable computer as recited in claim 6, further comprising:

a generally rectangular, interface block fixedly attached to the display rear, said interface block having a top surface, bottom surface, top side, bottom side, and opposing sides interconnecting said top and bottom surfaces and top and bottom sides said interface block top surface being adapted to be fixedly attached to said display rear;

two, parallel, spaced, beveled protrusions formed on said interface block bottom surface, said protrusions adapted to being inserted into said clamping element top surface beveled slits, said beveled protrusions having bottom surfaces formed into wedges compatible with the clamping element, slit channel, wedge-shaped protrusions.

8. An ergonomic portable computer as recited in claim 7, further comprising:

a compression spring placed about an upper portion of the beveled protrusion adjacent the interface block bottom surface.

\* \* \* \* \*